United States Patent
Katae et al.

(10) Patent No.: US 6,514,002 B1
(45) Date of Patent: Feb. 4, 2003

(54) ROTARY PIN

(75) Inventors: Kenichi Katae, Aichi-ken (JP); Kenji Chino, Aichi-ken (JP); Yoshihisa Iwanaga, Aichi-ken (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/350,192

(22) Filed: Jul. 9, 1999

(30) Foreign Application Priority Data

Jul. 14, 1998 (JP) .......... 10-198917
Jul. 14, 1998 (JP) .......... 10-198918

(51) Int. Cl.⁷ .......... F16C 11/06; B62D 17/00; B62D 7/20; F16N 1/00
(52) U.S. Cl. .......... 403/150; 403/157; 403/158; 403/161; 280/86.754; 280/86.756; 280/93.511; 384/396
(58) Field of Search .......... 403/150, 154, 403/157, 158, 152, 161; 280/86.754, 86.755, 86.756, 93.511; 384/396, 372, 373

(56) References Cited

U.S. PATENT DOCUMENTS

| | | | | |
|---|---|---|---|---|
| 1,280,117 A | * | 9/1918 | Winton | 403/152 |
| 1,289,408 A | * | 12/1918 | Davis | 384/396 |
| 1,673,459 A | * | 6/1928 | Jurad | 384/396 |
| 2,053,864 A | * | 9/1936 | Cook et al. | 384/396 |
| 2,103,161 A | * | 12/1937 | Kjaer | 384/396 |
| 2,446,348 A | * | 8/1948 | Webster | 92/157 |
| 2,531,326 A | * | 11/1950 | Di paolo et al. | 403/161 |
| 2,742,883 A | * | 4/1956 | Smith | 92/159 X |
| 2,841,427 A | * | 7/1958 | Sheppard | 403/74 |
| 3,011,812 A | * | 12/1961 | Warming | 403/157 |
| 3,129,966 A | * | 4/1964 | Blank | 403/156 |
| 3,179,451 A | * | 4/1965 | Blank, Sr. | 403/152 |
| 3,336,089 A | * | 8/1967 | Krickler | 384/396 X |
| 3,386,782 A | * | 6/1968 | Magil et al. | 384/396 |
| 3,492,054 A | * | 1/1970 | Boggs et al. | 305/118 |
| 3,543,863 A | * | 12/1970 | Ball | 403/152 X |
| 3,659,869 A | * | 5/1972 | Hase et al. | 280/96.1 |
| 3,677,613 A | | 7/1972 | Houtz | 308/135 |
| 3,822,100 A | * | 7/1974 | Reinsma et al. | 403/134 |
| 4,336,953 A | * | 6/1982 | Low | 280/95 R |
| 5,044,811 A | * | 9/1991 | Suzuki et al. | 403/134 |
| 5,044,812 A | * | 9/1991 | Ardelt et al. | 403/154 |
| 5,400,859 A | * | 3/1995 | Harrell | 172/219 |
| 5,551,794 A | * | 9/1996 | Aarre et al. | 403/374 |
| 6,042,295 A | * | 3/2000 | Barden | 403/158 |
| 6,047,789 A | * | 4/2000 | Iwanaga | 280/86.758 |

FOREIGN PATENT DOCUMENTS

| FR | 608254 | * | 6/1926 | 403/157 |
|---|---|---|---|---|
| GB | 576762 | | 3/1945 | |

* cited by examiner

Primary Examiner—Lynne H. Browne
Assistant Examiner—Ernesto Garcia
(74) Attorney, Agent, or Firm—Morgan & Finnegan, LLP

(57) ABSTRACT

A grease hold extends in an axial direction from one end of a rotary pin to an eccentric portion, and a pair of grease injection holes communicating to the grease hole is open on the outer circumferential surface of the eccentric portion. These grease injection holes are arranged so as to be axially separated on both sides from a central portion C of the eccentric portion by L/4 when L is an length of the eccentric portion.

12 Claims, 5 Drawing Sheets

ROTARY PIN

BACKGROUND OF THE INVENTION

1. Field of the Invention

The present invention relates to a rotary pin, and more particularly, to the structure of a pin having a grease hole that is rotatably supported to a bearing.

2. Description of the Related Art

In FIG. 7, part of a rear axle of a forklift is shown. A cylinder rod 5 of a cylinder 4 is coupled through a tie rod 3 to a knuckle arm 2 formed onto an axle shaft of a steering wheel 1. The knuckle arm 2 and the tie rod 3, and the tie rod 3 and the cylinder rod 5 are rotatably coupled to a rotary pin 6 and a rotary pin 7, respectively, and the steering wheel 1 rotates about a king pin 8 through the tie rod 3 and the knuckle arm 2 in accordance with expansion and contraction of the cylinder rod 5.

In FIG. 8, the rotary pin 7 that couples the tie rod 3 to the cylinder rod 5 is shown. The rotary pin 7 has an eccentric portion 9a that is rotatably supported to a bearing of the tie rod 3. When the rotary pin 7 is rotated about an axis thereof with respect to the cylinder rod 5, the eccentric portion 9a rotates about the central axis of the rotary pin 7. Accordingly, a relative position of the tie rod 3 to the cylinder rod 5 changes in accordance with its rotational angle. As a result, fine adjustment of a steering angle of the steering wheel 1 is performed.

It is arranged such that each time the cylinder rod 5 is expanded or contracted to control the steering wheel 1, the tie rod 3 rotates about the eccentric portion 9a of the rotary pin 7. Therefore, in order to improve lubricity between the eccentric portion 9a of the rotary pin 7 and the bearing of the tie rod 3, and in order to prevent abrasion of contact surfaces thereof, a grease hole 10a is formed in the rotary pin 7 from a top end thereof. The grease hole 10a is open on an outer circumferential surface of the eccentric portion 9a, so that grease can be injected onto the outer circumferential surface of the eccentric portion 9a from the top of the rotary pin 7 through the grease hole 10a.

Conventionally, however, as shown in FIG. 8, the grease hole 10a has been open at both ends of one diameter at the central portion in an axial direction of the eccentric portion 9a. Accordingly, the grease hole 10a penetrates a section on which the maximum load acts at the movement between the tie rod 3 and the cylinder rod 5, with the result that a problem arise in which the strength of the rotary pin 7 is lowered. Therefore, there was an anxiety that product life of the rotary pin 7 was shortened, for example, when an excessive impact force was applied to the steering wheel 1 or the like from outside.

Next, the rotary pin 6 that couples the knuckle arm 2 to the tie rod 3 is shown in FIG. 9. The rotary pin 6 has a spherical portion 9b that is rotatably supported to a bearing of the knuckle arm 2. It is arranged such that each time the cylinder rod 5 is expanded or contracted to control the steering wheel 1, the knuckle arm 2 rotates about the spherical portion 9b of the rotary pin 6. Therefore, in order to improve lubricity between the spherical portion 9b of the rotary pin 6 and the bearing of the knuckle arm 2, and in order to prevent abrasion of contact surfaces thereof, a grease hole 10b is formed in the rotary pin 6 from a top end thereof. The grease hole 10b is open on the outer circumferential surface of the spherical portion 9b, so that grease can be injected onto the outer circumferential surface of the spherical portion 9b from the top of the rotary pin 6 through the grease hole 10b.

As shown in FIG. 9, however, the grease hole 10b has been merely open at the central portions of the spherical portion 9b in the axial direction. Accordingly, it was difficult to inject grease uniformly over the outer circumferential surface of the spherical portion 9b, with the result that a problem arose in which grease was consumed rapidly in a short period of time.

SUMMARY OF THE INVENTION

The present invention was made to solve these problems, and it is an object of the present invention to provide a rotary pin in which grease can be injected onto a contact surface in contact with a bearing while keeping a required strength.

Further, it is another object of the present invention to provide a rotary pin in which grease can be injected uniformly onto the contact surface in contact with the bearing and it is possible to make grease last for a long period of time.

According to a first aspect of the present invention, there is provided a rotary pin rotatably supported to a bearing comprises:

a rotary pin main body; and a contact surface positioned at an outer circumferential portion of the rotary pin main body for being in contact with the bearing, a grease hole extending from one end of the rotary pin main body in an axial direction thereof, and a plurality of grease injection holes open on the contact surface so as to be axially separated on both sides from a central portion of the contact surface being communicated with the grease hole, respectively.

It is preferable that the plurality of grease injection holes are arranged so as to be axially separated on both sides from the central portion of the contact surface by L/4 when L is a length of the contact surface in the axial direction thereof. Furthermore, it is preferable that a pair of grease injection holes are arranged so as to be axially separated on both sides from the central portion of the contact surface and faced with each other in opposite directions. Or, it is preferable that four grease injection holes are formed respectively at both ends of a pair of diameters arranged in parallel with each other so as to be axially separated on both sides from the central portion of the contact surface. Further, a grease injection hole arranged at a position near the one end of the rotary pin main body may have a diameter smaller than that of a grease injection hole arranged at a position far from the one end of the rotary pin main body.

Further, four grease injection holes may be formed respectively at both ends of a pair of diameters arranged in orthogonal with each other so as to be axially separated on both sides from the central portion of the contact surface. The rotary pin may be a spherical pin having the contact surface convex toward outside. It is preferable that an edge portion of each grease injection hole is chamfered. The contact surface may be an outer circumference of an eccentric portion off-centered from a central axis of the rotary pin main body.

According to a second aspect of the present invention, there is provided a rotary pin having a spherical portion rotatably supported to a bearing comprises: a rotary pin main body; and a spherical portion positioned at an outer circumferential portion of the rotary pin main body for being in contact with the bearing, a grease hole extending from one end of the rotary pin main body in an axial direction thereof, at least one grease injection hole open on the outer circumferential surface of the spherical portion being communicated with the grease hole, at least one vertical grove which extends in an axial direction of the rotary pin main body for retaining grease and stirring grease being formed on the outer circumferential surface of the spherical portion.

A pair of grease injection holes may be formed at both ends of one diameter of the spherical portion that is orthogonal to the central axis of the rotary pin main body; and a pair of vertical groves may be formed at potions orthogonal to the pair of grease injection holes about a central axis of the rotary pin main body. A vertical grove may be formed so as to overlap with each grease injection hole. The plurality of grease injection holes may be arranged so as to be axially separated on both sides from the central portion of the spherical portion. The spherical portion may be off-centered from a central axis of the rotary pin main body.

DETAILED DESCRIPTION OF THE PREFERRED EMBODIMENTS

Figure 1:
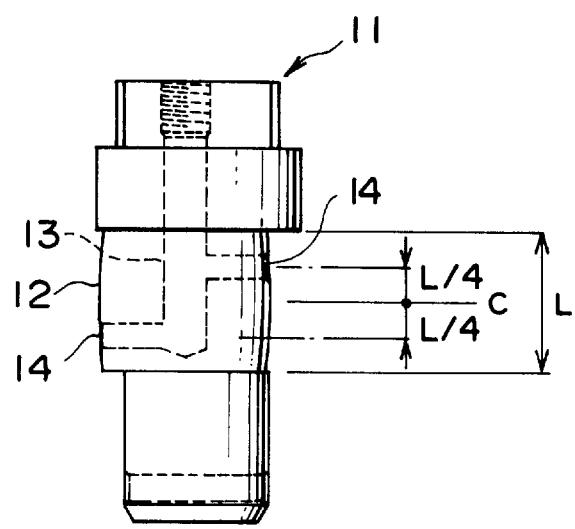
FIG. 1 is a side view showing a rotary pin according to Embodiment 1 of the present invention.
Figure 2:
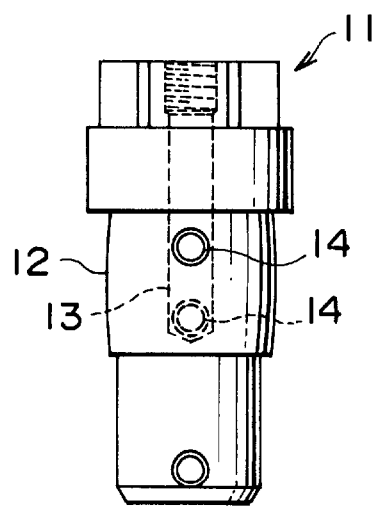
FIG. 2 is a front view showing the rotary pin according to Embodiment 1.

Embodiment 1:

In FIGS. 1 and 2, a rotary pin 11 according to Embodiment 1 of the present invention has an eccentric portion 12 whose outer circumferential surface is convex toward outside. When the rotary pin 11 is used, the eccentric portion 12 is rotatably supported to a bearing of a tie rod or the like. There is a grease hole 13 extending in an axial direction from one end of the rotary pin 11 to the eccentric portion 12. Further, on the outer circumferential surface of the eccentric portion 12, a pair of grease injection holes 14 are open, which communicates to the grease hole 13. These grease injection holes 14 are arranged so as to be axially separated on both sides from the central portion C of the eccentric portion 12 by L/4 when L is a length of the eccentric portion 12 in the axial direction thereof, and they are faced with each other in the opposite directions.

That is, there is no grease hole 13 open in the central portion C in the axial direction of the eccentric portion 12 on which a large load acts. Therefore, a sufficient strength for a rotary pin is ensured. Especially, in the rotary pin 11 according to Embodiment 1, the eccentric portion 12 supported to a bearing is convex toward outside. Accordingly, a maximum load is applied onto the central portion C in the axial direction, and the bending load becomes a minimum at positions separated on both sides from the central portion C by L/4 in the axial direction. Since the grease injection holes 14 are arranged at these positions where the load is a minimum, lowering of strength of the rotary pin 11 caused by the formation of the grease hole 13 and the grease injection holes 14 can be minimized. Also, edge portions of these grease injection holes 14 are chamfered like a cone, respectively.

When the rotary pin 11 is used, the eccentric portion 12 is supported to a bearing of a tie rod or the like. When grease is injected from the grease hole 13 that is open at one end of the rotary pin 11, the grease is led out from both grease injection holes 14 via the grease hole 13 onto the outer circumferential surface of the eccentric portion 12 that is a surface in contact with the bearing. In this case, two grease injection holes 14 are not equal in height (position in an axial direction), but are arranged so as to be separated on both sides of the central portion C in the axial direction. Accordingly, it does not occur for the grease to be locally injected on one side with respect to the central portion C in the axial direction, but the grease is uniformly injected onto the outer circumferential surface of the eccentric portion 12. Since the edge portions of the respective grease injection holes 14 are chamfered like a cone, uniform injection of grease is further enhanced.

Figure 3A:
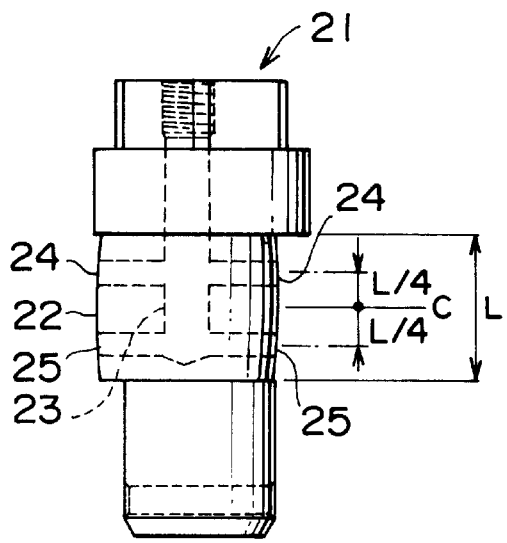
FIG. 3A is a side view showing a rotary pin according to Embodiment 2.

Embodiment 2:

In FIG. 3A, a rotary pin 21 according to Embodiment 2 is shown. In the rotary pin 21, four pieces of grease injection holes 24, 24, 25, and 25 communicating to a grease hole 23 are open on the outer circumferential surface of an eccentric portion 22. Among them, two pieces of grease holes 24 and 24 are disposed at both ends of one diameter on one side apart from the central portion C of the eccentric portion 22 in the axial direction by L/4 with respect to the length L in an axial direction of the eccentric portion 22, whereas the other two pieces of grease injection holes 25 and 25 are disposed at both ends of a diameter in parallel with the diameter on which the above grease injection holes 24 and 24 are positioned on the other side apart from the central portion C of the eccentric portion 22 in the axial direction by L/4.

With such an arrangement; grease can more uniformly be injected. In Embodiment 2, sufficient strength can also be ensured, since there is no grease injection hole communicating to the grease hole 23 open in the central portion of the eccentric portion 22 in the axial direction.

Figure 3B:
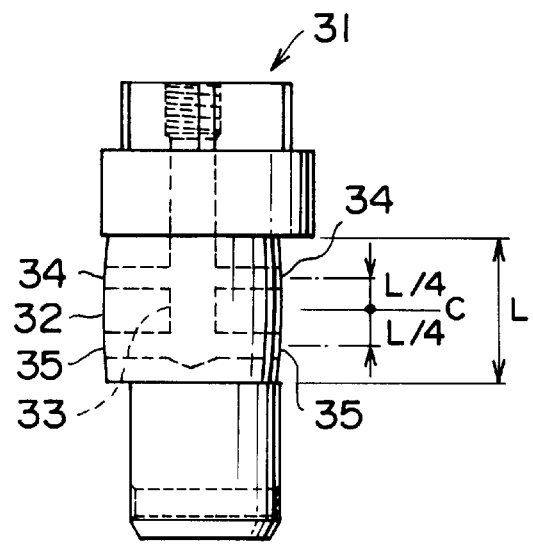
FIGS. 3B and 3C are side views respectively showing modifications of Embodiment 2.

Further, the grease charging pressure of the grease injection holes 24 and 24 on the proximal end side of the grease hole 23 is a little higher than that of the distal grease injection holes 25 and 25. Accordingly, in order to uniformly inject the grease, it is desirable that the grease can be uniformly injected even if the diameter of grease injection holes 34 and 34 on the proximal end side of a grease hole 33 is made smaller than that of grease injection holes 35 and 35 on the distal end side of the grease hole 33, as shown in a rotary pin 31 of FIG. 3B.

Figure 3C:
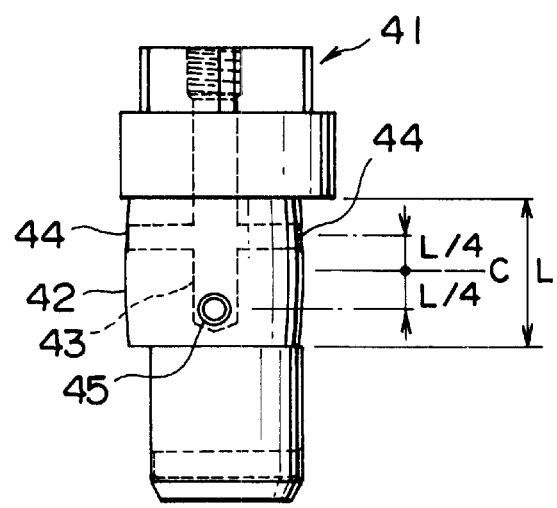

Moreover, as shown in a rotary pin 41 of FIG. 3C, it is also possible to arrange grease injection holes 44 and 44 on the proximal end side of a grease hole 43 and grease injection holes 45 and 45 on the distal end side of the grease hole 43 on two diameters that are orthogonal with each other and are separated therebetween.

Incidentally, in Embodiments 1 and 2, although descriptions have been made of a spherical pin with a convex shaped eccentric portion, the present invention is not limited to a spherical pin, but it can be applied to a rotary pin in which a surface in contact with a bearing is cylindrical. Furthermore, the present invention may be applied to a rotary pin having no eccentric portion.

As described above, according to the first aspect of the present invention, the plurality of grease injection holes are arranged on a surface in contact with the bearing so as to be axially separated on both sides from the central portion of the contact surface, so that grease can be injected onto the contact surface while ensuring a required strength.

Figure 4:
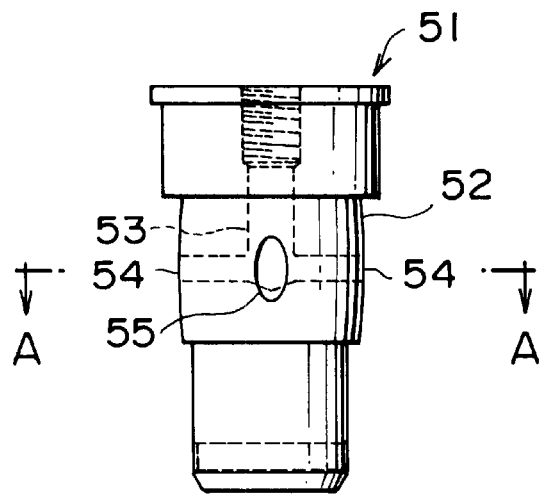
FIG. 4 is a side view showing a rotary pin according to Embodiment 3 of the present invention.
Figure 5:
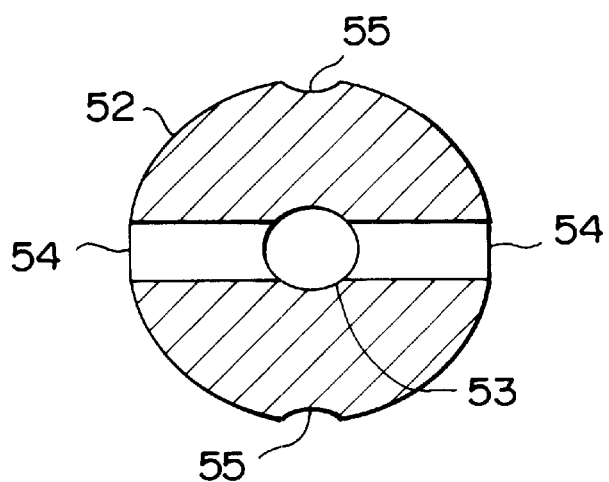
FIG. 5 is a cross sectional view taken along the line A-A of the rotary pin according to Embodiment 3.

Embodiment 3:

In FIGS. 4 and 5, a rotary pin 51 according to Embodiment 3 of the present invention is shown. The rotary pin 51 has a spherical portion 52, and when the rotary pin 51 is used, the spherical portion 52 is rotatably supported to a bearing of a knuckle arm or the like. There is a grease hole 53 extending in an axial direction from one end of the rotary pin 51 to the spherical portion 52. Also, on the outer circumferential surface of the spherical portion 52, a pair of grease injection holes 54 communicating to the grease hole 53 are open at both ends of one diameter of the spherical portion 52. Further, on the outer circumferential surface of the spherical portion 52, a pair of vertical grooves 55 are formed at portions orthogonal to the pair of grease injection holes 54 about the central axis of the spherical portion 52. Each vertical groove 55 is positioned at a height (position in an axial direction) equal to that of the grease injection hole 54, and has a shape longitudinally long in the axial direction.

When the rotary pin 51 is used, the spherical portion 52 is supported to a bearing of a knuckle arm or the like. When grease is injected from the grease hole 53 that is open at one end of the rotary pin 51, the grease is led out from both grease injection holes 54 via the grease hole 53 onto the outer circumferential surface of the spherical portion 52 that is a surface in contact with a bearing. The grease is injected onto the entire outer circumferential surface of the spherical portion 52 in accordance with the rotation of the rotary pin 51 in the bearing. However, since the pair of vertical grooves 55 is formed on the outer circumferential surface of the spherical portion 52, the grease enters these vertical grooves 55 to be retained therein. As a result, the grease lasts for a long period of time, and the length of time until the grease runs out becomes longer. Further, since the vertical grooves 55 are formed on the outer circumferential surface of the spherical portion 52 that is the surface in contact with the bearing, the grease is sufficiently stirred in accordance with the rotation of the rotary pin 51 in the bearing, and uniform injection of grease is enhanced.

In this rotary pin 51 according to Embodiment 3, each vertical groove 55 is formed at a portion orthogonal to the pair of grease injection holes 54 about the central axis of the spherical portion. Accordingly, the stress acting on the spherical portion 52 may sufficiently be scattered during the rotation in the bearing, and lowering of strength of the rotary pin 51 caused by the formation of the vertical grooves 55 can be minimized.

Figure 6A:
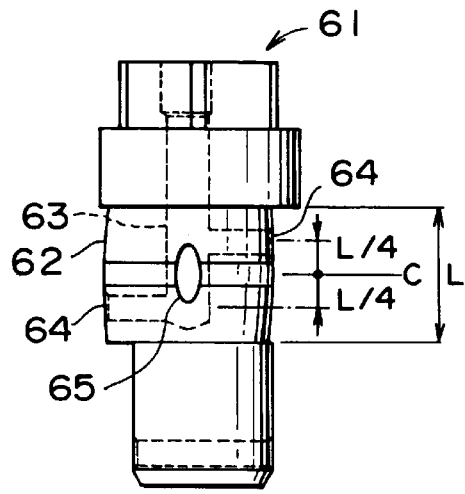
FIGS. 6A and 6B are a side view and a front view showing a rotary pin according to Embodiment 4, respectively.
Figure 6B:
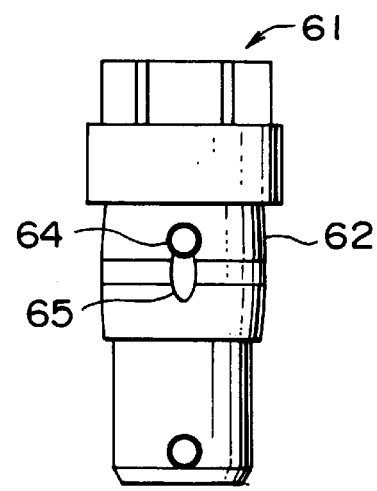
Figure 7:
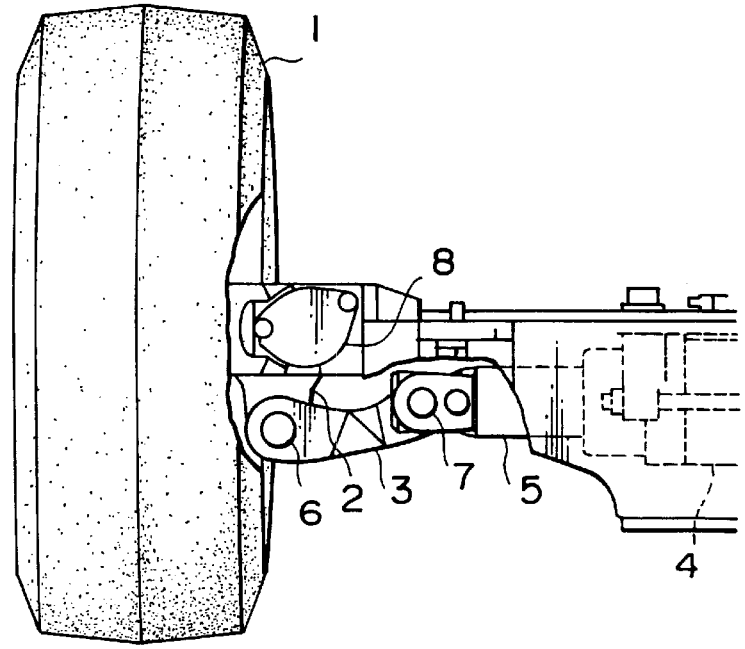
FIG. 7 is a plan view with a part cut away showing a rear axle of a forklift.
Figure 8:
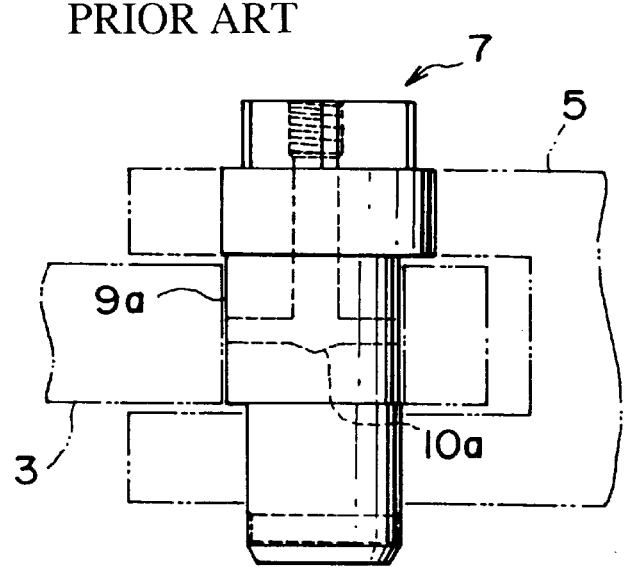
FIG. 8 is a side view showing a conventional rotary pin.
Figure 9:
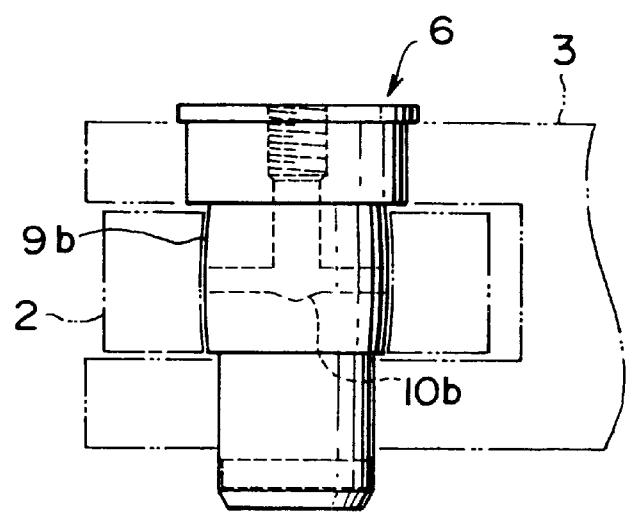
FIG. 9 is a side view showing another conventional rotary pin.

Embodiment 4:

In FIGS. 6A and 6B, a rotary pin 61 according to Embodiment 4 is shown. The rotary pin 61 is, for example, an eccentric pin for rotatably coupling a tie rod to a cylinder rod shown in FIG. 7. A spherical portion 62 forms an eccentric portion having an axis off-centered from the central axis of the rotary pin 61, and the spherical portion 62 is, for example, rotatably supported to a bearing of a tie rod. There is a grease hole 63 extending in an axial direction from one end of the rotary pin 61 to the spherical portion 62. On the outer circumferential surface of the spherical portion 62, a pair of grease injection holes 64 communicating to the grease hole 63 are open. These grease injection holes 64 are arranged on both sides so as to be axially separated from the central portion C of the spherical portion 62 by L/4 when L is an axial length of the spherical portion 62, and they are faced with each other in the opposite directions.

Further, on the outer circumferential surface of the spherical portion 62, two vertical grooves 65 are formed over the pair of grease injection holes 64, respectively. Also, the other two vertical grooves 65 are formed at portions orthogonal to the grease injection holes 64 about the central axis of the spherical portion 62, respectively. That is, four pieces of vertical grooves 65 in total are formed so that they are distributed in the circumferential direction of the outer circumferential surface of the spherical portion 62. These vertical grooves 65 are positioned at the same height with each other (position in an axial direction), and have shapes longitudinally long in the axial direction.

In the rotary pin 61 thus constructed, two grease injection holes 64 are arranged so as to be axially separated on both sides from the central position of the spherical portion 62. As a result, it does not occur for the grease to be locally injected on one side with respect to the central portion in the axial direction. Also, because of existence of the vertical grooves 65, the grease is well stirred and uniform injection of grease is enhanced. Further, since there is no grease hole 63 open in the central portion in the axial direction of the spherical portion 62 on which the maximum load is applied during use, sufficient strength is ensured for the rotary pin 61.

In the above Embodiments 3 and 4, two pieces or four pieces vertical grooves are formed on the outer circumferential portion of the spherical portion, but the number of vertical grooves is not limited to a specific number.

As described above, according to Embodiments 3 and 4, vertical grooves for keeping and stirring grease are formed in the axial direction on the outer circumferential surface of the spherical portion. As a result, not only the grease can be uniformly injected onto the surface in contact with the bearing but also the grease can be made to last for a long period of time.

What is claimed is:

1. A rotary pin rotatably supported to a bearing and under a load, the rotary pin comprising:
   a rotary pin main body;
   an eccentric portion on the rotary pin main body and having a contact surface being convex toward outside, wherein said contact surface is positioned at an outer circumferential portion of said rotary pin main body, for being in contact with the bearing;
   a grease hole extending from one end of said rotary pin main body in an axial direction thereof; and
   a plurality of grease injection holes open on said contact surface and axially separated from a central portion of said contact surface by L/4 where L is a length of said contact surface in the axial direction thereof, respectively.

2. A rotary pin according to claim 1, wherein a pair of grease injection holes, of the plurality of grease injection holes, are arranged and axially separated, one on each side of the central portion of said contact surface and face in opposite directions.

3. A rotary pin according to claim 1, wherein the plurality of grease holes comprise four grease injection holes, said four grease injection holes formed one at each end of a pair of diameters arranged in parallel with each other and axially separated from the central portion of said contact surface.

4. A rotary pin according to claim 1, wherein a grease injection hole, of the plurality of grease injection holes, arranged at a position near the one end of said rotary pin main body has a diameter smaller than that of a grease injection hole, of the plurality of grease injection holes, arranged at a position far from the one end of said rotary pin main body for uniform injection of grease.

5. A rotary pin according to claim 1, wherein the plurality of grease injection holes comprise four grease injection holes that are positioned orthogonally with respect to each other on each quadrant of said contact surface and axially separated from the central portion of said contact surface.

6. A rotary pin according to claim 1, wherein an edge portion of each grease injection hole is chamfered.

7. A rotary pin according to claim 1, wherein said contact surface is an outer circumference of an eccentric portion with regards to a central axis of said rotary pin main body.

8. A rotary pin rotatably supported to a bearing and under a load, the rotary pin comprising:

a rotary pin main body, a convex portion positioned at an outer circumferential portion of said rotary pin main body for being in contact with the bearing, a grease hole extending from one end of said rotary pin main body in an axial direction thereof, a pair of grease injection holes, open on the outer circumferential surface of said convex portion, being communicated with said grease hole, said grease injection holes formed at each end of one diameter of said convex portion that is orthogonal to the central axis of said rotary pin main body such that the grease injection holes are arranged where load is minimized for reducing pin breakage, and a pair of vertical grooves which extend in an axial direction of said rotary pin main body for retaining grease and stirring grease being formed on the outer circumferential surface of said spherical portion, said grooves being formed at portions orthogonal to said grease injection holes about a central axis of said rotary pin main body.

9. A rotary pin according to claim 8, wherein a vertical groove is formed so as to overlap with each grease injection hole.

10. A rotary pin according to claim 8, wherein said grease injection holes are arranged on said convex portion and axially separated on both sides of said convex portion from the central portion of said convex portion.

11. A rotary pin according to claim 8, wherein said convex portion is off-centered from a central axis of said rotary pin main body.

12. A rotary pin rotatably supported to a bearing and under a load, the rotary pin comprising:

a rotary pin main body;

an eccentric portion on the main body and having a contact surface being convex toward outside, wherein said contact surface is positioned at an outer circumferential portion of said rotary pin main body, for being in contact with the bearing;

a grease hole extending from one end of said rotary pin main body in an axial direction thereof;

a pair of grease injection holes open on said contact surface and axially separated from a central portion of said contact surface by L/4 where L is a length of said contact surface in the axial direction thereof, facing opposite directions; and a plurality of grooves, which extend in an axial direction of said rotary pin main body for retaining grease and stirring grease, being formed at axially central portion on the outer circumferential surface of said convex portion, some of said grooves being formed so as to overlap with some of said grease injection holes, and the others of said grooves being formed at portions orthogonal to said grease injection holes about a central axis of said rotary pin main body.

* * * * *

UNITED STATES PATENT AND TRADEMARK OFFICE
CERTIFICATE OF CORRECTION

PATENT NO. : 6,514,002 B1
DATED : January 21, 2003
INVENTOR(S) : Katae et al.

It is certified that error appears in the above-identified patent and that said Letters Patent is hereby corrected as shown below:

Title page,
Item [57], ABSTRACT,
Line 7, please delete "when L is an length" and insert therefore -- when L is an axial length --.

Signed and Sealed this

First Day of July, 2003

JAMES E. ROGAN
*Director of the United States Patent and Trademark Office*